(12) United States Patent
Guo

(10) Patent No.: US 8,565,128 B2
(45) Date of Patent: Oct. 22, 2013

(54) METHOD AND APPARATUS OF HANDLING A TIMER FOR TRIGGERING BUFFER STATUS REPORT

(75) Inventor: Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 441 days.

(21) Appl. No.: 12/561,275

(22) Filed: Sep. 17, 2009

(65) Prior Publication Data

US 2010/0080185 A1 Apr. 1, 2010

Related U.S. Application Data

(60) Provisional application No. 61/100,275, filed on Sep. 26, 2008.

(51) Int. Cl.
*H04L 7/00* (2006.01)
*H04J 3/08* (2006.01)

(52) U.S. Cl.
USPC .......................................... 370/305; 370/328

(58) Field of Classification Search
USPC .................................................. 370/305, 328
See application file for complete search history.

(56) References Cited

U.S. PATENT DOCUMENTS

| | | | |
|---|---|---|---|
| 8,243,667 B2* | 8/2012 | Chun et al. ................... | 370/329 |
| 2008/0045255 A1 | 2/2008 | Revel | |
| 2009/0316593 A1* | 12/2009 | Wang et al. .................... | 370/252 |
| 2010/0034147 A1* | 2/2010 | Ho et al. ........................ | 370/328 |
| 2010/0035581 A1* | 2/2010 | Park et al. .................... | 455/412.1 |
| 2010/0040028 A1* | 2/2010 | Maheshwari et al. ........ | 370/336 |
| 2010/0070814 A1* | 3/2010 | Damnjanovic et al. ....... | 714/748 |
| 2010/0077100 A1* | 3/2010 | Hsu et al. ...................... | 709/234 |

FOREIGN PATENT DOCUMENTS

| | | |
|---|---|---|
| KR | 1020080044168 A | 5/2008 |
| KR | 1020090055587 A | 6/2009 |
| KR | 1020090076826 A | 7/2009 |
| KR | 1020090094760 A | 9/2009 |
| WO | 2008024890 A2 | 2/2008 |
| WO | 2008115134 A2 | 9/2008 |
| WO | 2009116939 A2 | 9/2009 |

OTHER PUBLICATIONS

Nokia Corporation et al: "PHR and BSR Periodic Timer Start" 3GPP Draft TSG-RAN2 Meeting #63bis, R2-085000, Sep. 29-Oct. 3, 2008, Paragraph [5.4.5], XP050319972, Prague, Czech Republic.
Ericsson: "SR triggering in relation to uplink grants" 3GPP Draft TSG-RAN WG2 #61bis, Tdoc R2-081468, Mar. 31-Apr. 4, 2008, pp. 1/3 to 3/3, XP050139212, Shenzhen, China.
3GPP, TS 36.322-830, Sep. 2008.
3GPP, R2-084141, Aug. 2008.
3GPP, R2-083149, Jul. 2008.
3GPP, R2-084362, Aug. 2008.
3GPP, R2-085386, Sep. 2008.
Notice of Allowance on corresponding fn foreign Patent Application (KR 10-2009-0090614) issued on Aug. 31. 2011.
3GPP TS36.321 v8.3.0 (Sep. 2008), pp. 23,24,26.
3GPP TS36.321 v8.4.0 (Dec. 2008, pp. 25,26,29.
Office Action on corresponding foreign application (JP2009-201927) from JPO dated Nov. 22, 2011.

* cited by examiner

*Primary Examiner* — Mark Rinehart
*Assistant Examiner* — Angel Brockman
(74) *Attorney, Agent, or Firm* — Blue Capital Law Firm, P.C.

(57) ABSTRACT

A method of handling a timer for triggering buffer status report in a user equipment of a wireless communication system is disclosed. The method includes starting a timer used for triggering a buffer status report (BSR), and restarting the timer in a transmission time interval (TTI) for which a semi-persistent scheduling uplink grant has been configured.

8 Claims, 5 Drawing Sheets

METHOD AND APPARATUS OF HANDLING A TIMER FOR TRIGGERING BUFFER STATUS REPORT

CROSS REFERENCE TO RELATED APPLICATIONS

This application claims the benefit of U.S. Provisional Application No. 61/100,275, filed on Sep. 26, 2008 and entitled "Polling operation in ARQ layer", the contents of which are incorporated herein by reference.

BACKGROUND OF THE INVENTION

1. Field of the Invention

The present invention relates to a method and apparatus for handling a timer for triggering a buffer status report (BSR), and more particularly, to a method and apparatus for handling a timer for triggering a BSR in a user equipment (UE) of a wireless communication system, so as to avoid waste of network resources.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in base stations (Node Bs) alone rather than in Node Bs and RNC (Radio Network Controller) respectively, so that the system structure becomes simple.

In LTE system, based on 3GPP specification "TS 36.321 V8.3.0," a Buffer Status Report (BSR) is used to provide the network with information about the amount of data in uplink (UL) buffers of a UE. The BSR will generate a BSR MAC Control Element, which includes information about the amount of data available for transmission in RLC layer and Packet Data Convergence Protocol (PDCP) layer, when being triggered. The BSR shall be triggered when UL data becomes available for transmission and the data belongs to a logical channel with higher priority than those for which data already existed in the UE transmission buffer, in which case the BSR is referred to as "Regular BSR." When the BSR is triggered but there is no allocated resource for new transmission, the UE would then trigger a Scheduling Request (SR) procedure for requesting uplink resources, i.e. UL-SCH resources, to send the BSR MAC Control Element. Note that only the Regular BSR can trigger the SR procedure when the UE has no UL resources allocated for new transmission for a current transmission time interval (TTI).

When the BSR MAC Control Element is transmitted, the network may not be able to successfully receive the BSR MAC Control Element, and thus would not allocate any uplink transmission resources to the UE. In this case, if the reason for triggering the BSR is no longer satisfied, such as no higher priority data becomes available for transmission, for example, the UE would have no uplink transmission resources for use and enter into a deadlock situation. Therefore, in order to solve this problem, the prior art proposes a BSR retransmission mechanism, which utilizes a Retransmission BSR Timer, i.e. a timer RETX_BSR_TIMER, to enhance the reliability of BSR transmission. The UE starts the timer RETX_BSR_TIMER when a BSR MAC control element is generated, and restarts (if running) the timer RETX_BSR_TIMER when UL resources allocated for new transmission are received, e.g. on the PDCCH or in a Random Access Response, which indicates the BSR MAC Control Element is successfully received by the network. When the timer RETX_BSR_TIMER expires and the UE has data available for transmission in the buffer, the UE shall trigger a BSR, in which case the BSR is also referred to as "Regular BSR."

However, the LTE system has two scheduling methods: dynamic scheduling (DS) and semi-persistent scheduling (SPS). For DS, the network dynamically allocates resources to UEs for data reception or transmission depending on traffic volume, quality of service (QoS) requirements of each UE. And for SPS, the network periodically allocates resource to UEs, in order to serve upper layer applications which generate semi-static size data periodically, e.g. Voice over Internet Protocol (VoIP) services, for reducing control information sent on a physical downlink control channel (PDCCH) and enhancing system scheduling performance. In other words, SPS provides semi-persistent transmission resources, i.e. configured UL grant, to the UE, such that the UE can perform periodic data transmission without receiving PDCCH.

Please refer to FIG. 1, which illustrates operation of the timer RETX_BSR_TIMER when SPS is activated. As mentioned above, semi-persistent transmission resources would be allocated to the UE by SPS at a fixed period, such as at timing point A, B, C and E. Assume that the UE sends a BSR MAC Control Element to the network at a timing point A and starts the timer RETX_BSR_TIMER. Under a situation that the SPS UL grant has been configured, the network may not allocate dynamic UL resources to the UE because the UE already has configured UL grant to do UL transmission. However, according to the operation of the timer RETX_BSR_TIMER, if no UL resource for new transmission has been received upon expiration of the timer RETX_BSR_TIMER, such as at timing point D, the UE shall trigger a BSR, and thus further triggers the SR procedure. In this case, the BSR and SR are triggered unnecessarily, which causes waste of network resources.

SUMMARY OF THE INVENTION

It is therefore an objective of the present invention to provide a method and apparatus for handling a timer for triggering a buffer status report (BSR) in a user equipment (UE) of a wireless communications system, so as to avoid waste of network resources.

According to the present invention, a method for handling a timer for triggering a buffer status report (BSR) in a user equipment (UE) of a wireless communication system is disclosed. The method includes steps of starting a timer used for triggering a BSR; and restarting the timer in a transmission time interval (TTI) for which a semi-persistent scheduling uplink grant has been configured.

According to the present invention, a communications device for handling a timer for triggering a buffer status report (BSR) in a user equipment (UE) of a wireless communication system is disclosed. The communications device includes a processor for executing a program code, and a memory, coupled to the processor, for storing the program. The program includes steps of starting a timer used for triggering a BSR; and restarting the timer in a transmission time interval (TTI) for which a semi-persistent scheduling uplink grant has been configured.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
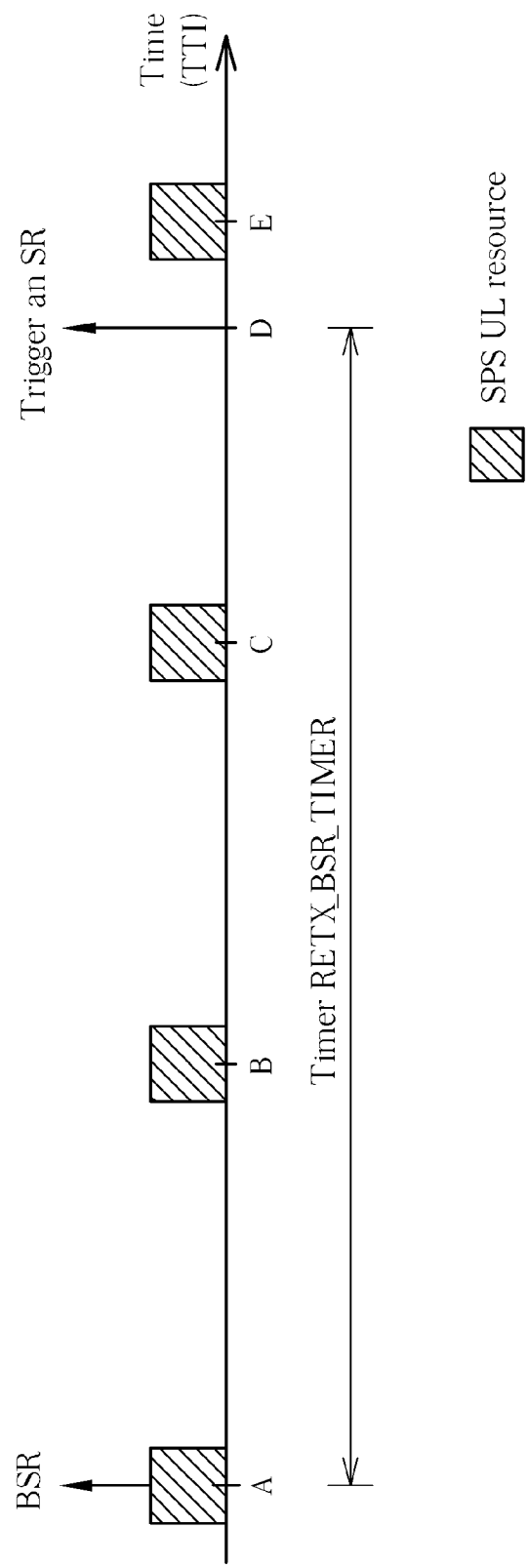
FIG. 1 illustrates operation of a timer RETX_BSR_TIMER when SPS is activated.
Figure 2:
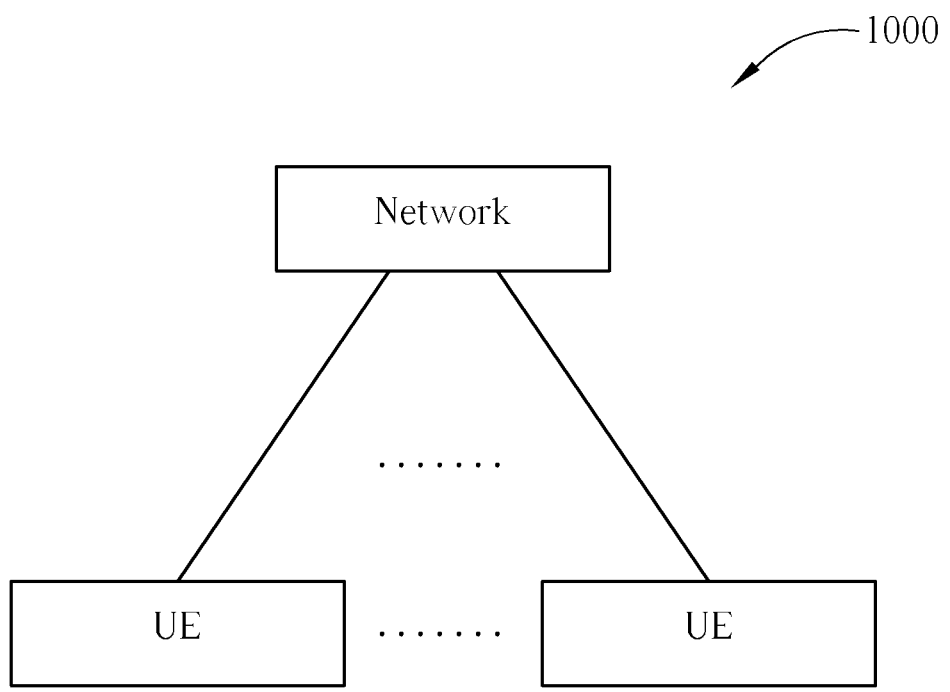
FIG. 2 is a schematic diagram of a wireless communications system.

Please refer to FIG. 2, which illustrates a schematic diagram of a wireless communications system 1000. The wireless communications system 1000 is preferred to be an LTE (long-term evolution) system, and is briefly composed of a network and a plurality of user equipments (UEs). In FIG. 2, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 3:
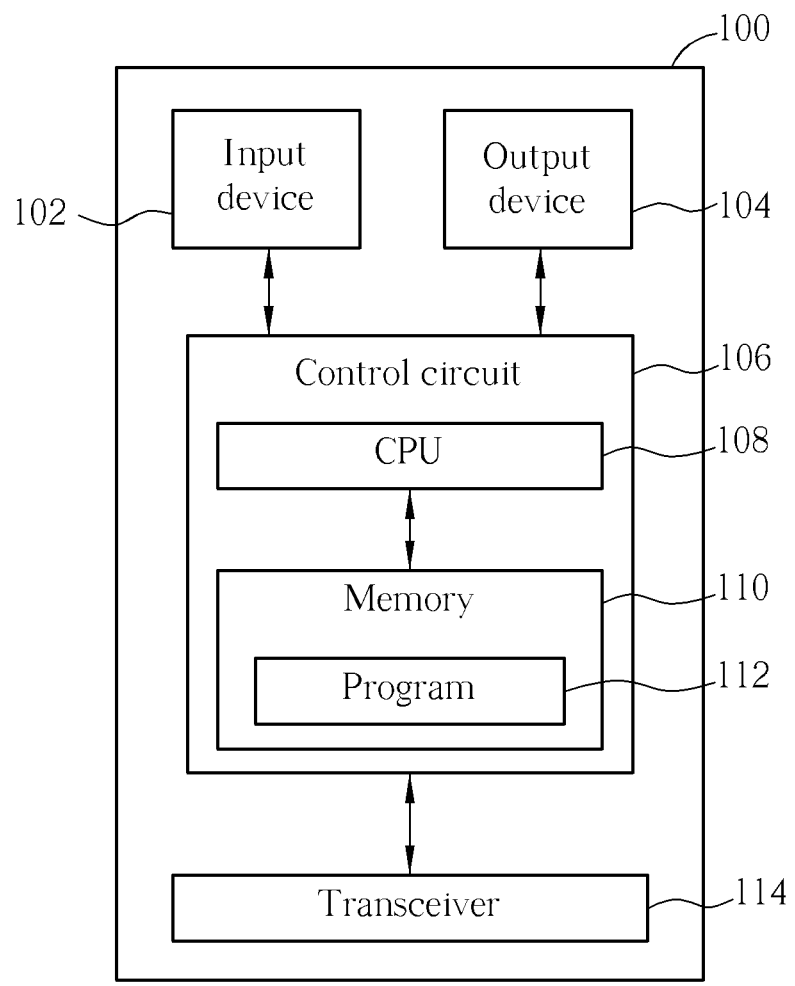
FIG. 3 is a function block diagram of a wireless communications device.

Please refer to FIG. 3, which is a functional block diagram of a communications device 100 in a wireless communications system. The communications device 100 can be utilized for realizing the UEs in FIG. 2. For the sake of brevity, FIG. 3 only shows an input device 102, an output device 104, a control circuit 106, a central processing unit (CPU) 108 (or processor), a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
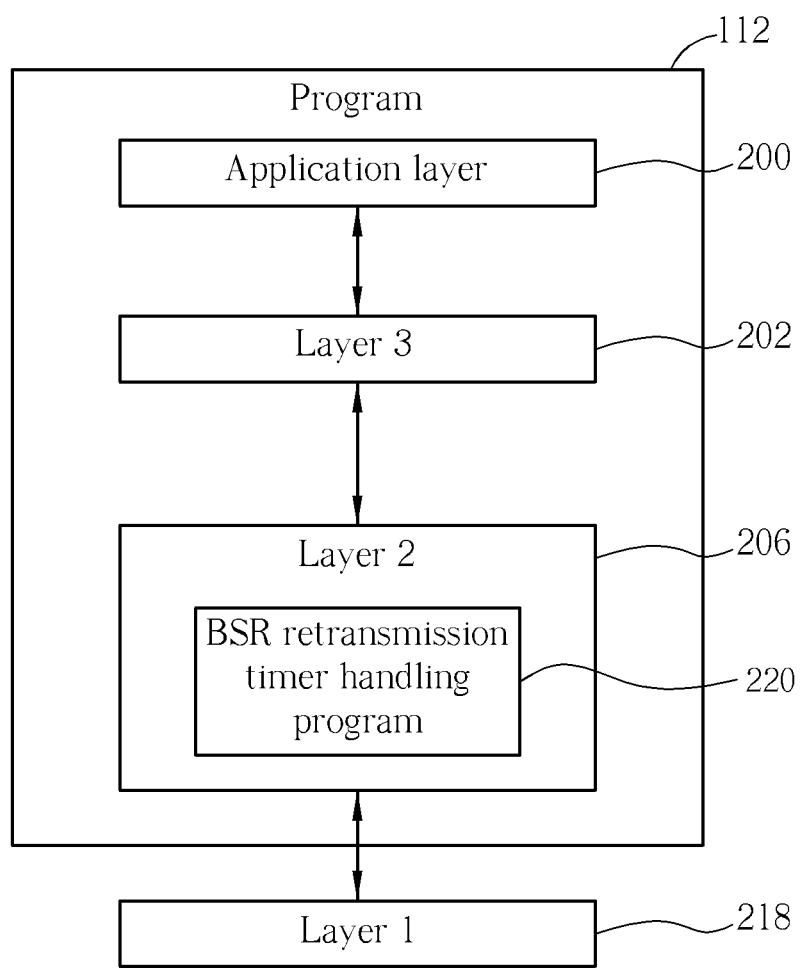
FIG. 4 is a diagram of program code of FIG. 3.

Please continue to refer to FIG. 4. FIG. 4 is a diagram of the program 112 shown in FIG. 3. The program 112 includes an application layer 200, a Layer 3 202, and a Layer 2 206, and is coupled to a Layer 1 218. The Layer 3 202 includes a Radio Resource Control (RRC) layer, and performs radio resource control. The Layer 2 206 includes a Packet Data Convergence Protocol (PDCP)layer, a Radio Link Control (RLC) layer and a Medium Access Control (MAC) layer, and performs link control. The Layer 1 218 performs physical connections.

Figure 5:
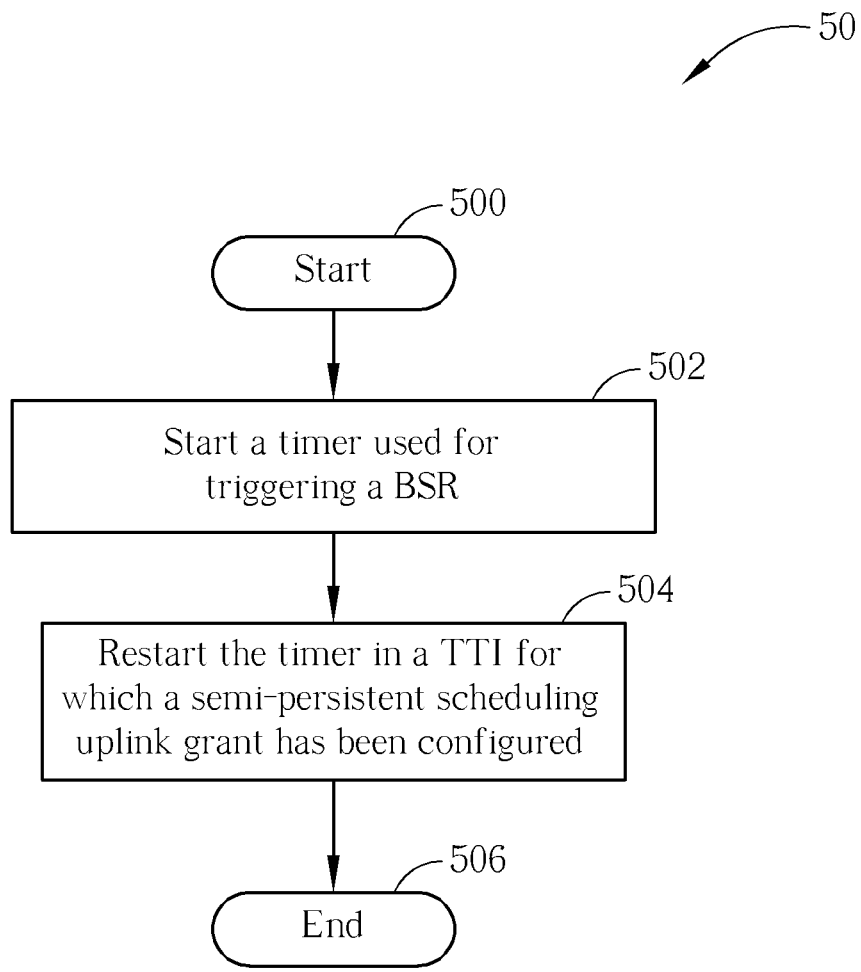
FIG. 5 is a flowchart of a process according to an embodiment of the present invention.

In LTE system, when the UE performs a Buffer Status Report (BSR) procedure under a situation that uplink (UL) Semi-Persistent Scheduling (SPS) has been activated, the network may not allocate UL resources, or called UL grant, to the UE because the UE already has configured UL grant to do UL transmission. As a result, a Retransmission BSR Timer, i.e. the timer RETX_BSR_TIMER, would expire and thus trigger a BSR and a scheduling request (SR) procedure. In this case, the embodiment of the present invention provides a BSR retransmission timer handling program 220 for avoiding unnecessary BSR retransmissions when the UL SPS has been activated. Please refer to FIG. 5, which illustrates a schematic diagram of a process 50. The process 50 is utilized for handling a timer for triggering a BSR in a UE of the wireless communications system 1000, and can be compiled into the BSR retransmission timer handling program 220. The process 50 includes the following steps:

Step 500: Start.

Step 502: Start a timer used for triggering a BSR.

Step 504: Restart the timer in a transmission time interval (TTI) for which a semi-persistent scheduling uplink grant has been configured.

Step 506: End.

According to the process 50, the UE first starts the timer for triggering the BSR, which is preferably referred to as a BSR retransmission timer. Then, the UE restarts the timer in the TTI for which the SPS uplink grant has been configured, such that the embodiment of the present invention can avoid expiration of the timer triggering a BSR and a SR procedure.

Besides, when the said timer expires and there is data available for transmission in a UE buffer, the UE shall trigger a BSR. Generally, the BSR is a Regular BSR.

As stated in the prior art, under a situation that the UL SPS is activated, the network may not allocate dynamic UL resources to the UE because the UE already has configured UL grant to do UL transmission. In this case, the UE would not receive any UL resources for new transmission upon expiration of the BSR retransmission timer, and perform unnecessary actions, such as triggering the BSR and the SR procedure, which causes waste of network resources. Therefore, the UE according to the present invention restarts the BSR retransmission timer in the TTI for which the SPS uplink grant has been configured, such that the BSR triggering and the SR procedure can be prevented from being executed due to expiration of the timer.

In summary, the embodiment of the present invention provides a method for handling the BSR retransmission timer to avoid the SR procedure and the BSR triggering being executed unnecessarily, so as to enhance usage efficiency of network resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a timer for triggering a buffer status report (BSR) in a user equipment (UE) of a wireless communication system, the method comprising:
    starting a timer used for triggering a BSR; and
    restarting the timer, if the timer is running, in a transmission time interval (TTI) for which a semi-persistent scheduling uplink grant has been configured:
    wherein the uplink grant for the TTI has or has not been received on a physical downlink control channel (PDCCH) for a semi-persistent cell radio network temporary identifier (C-RNTI) of the UE.

2. The method of claim 1, wherein the BSR is triggered when the timer expires and the UE has data available for transmission.

3. The method of claim 1, the BSR is a Regular BSR.

4. The method of claim 1, wherein the timer is a retransmission BSR timer (RETX_BSR_TIMER).

5. A communication device for handling a timer for triggering a buffer status report (BSR) in a user equipment (UE) of a wireless communication system, the communication device comprising:

a processor for executing a program; and
a memory, coupled to the processor, for storing the program;
wherein the program comprises:
- starting a tinier used for triggering a BSR; and
- restarting the timer, if the timer is running, in a transmission time interval (TTI) for which a semi-persistent scheduling uplink grant has been configured;
- wherein the uplink grant for the TTI has or has not been received on a physical downlink control channel (PDCCH) for a semi-persistent cell, radio network temporary identifier (C-RNTI) of the UE.

6. The communication device of claim 5, wherein the BSR is triggered when the timer expires and the UE has data available for transmission.

7. The communication device of claim 5, wherein the BSR is a Regular BSR.

8. The communication device of claim 5, wherein the timer is a retransmission BSR timer ($RETX_{13}$ BSR_TIMER).

* * * * *